US011052541B1

(12) United States Patent
Howard et al.

(10) Patent No.: US 11,052,541 B1
(45) Date of Patent: Jul. 6, 2021

(54) AUTONOMOUS ROBOT TELEROBOTIC INTERFACE

(71) Applicant: Facebook, Inc., Menlo Park, CA (US)

(72) Inventors: Zachary Ian Howard, San Francisco, CA (US); Ryan Christopher Cargo, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 267 days.

(21) Appl. No.: 16/210,403

(22) Filed: Dec. 5, 2018

(51) Int. Cl.
*B25J 9/16* (2006.01)
*G05D 1/00* (2006.01)

(52) U.S. Cl.
CPC ............ *B25J 9/1689* (2013.01); *B25J 9/162* (2013.01); *G05D 1/0038* (2013.01); *G05D 1/0061* (2013.01); *G05D 1/0088* (2013.01); *G05D 2201/02* (2013.01)

(58) Field of Classification Search
CPC ........ B25J 9/1689; B25J 9/162; B25J 11/008; B25J 13/065; B25J 13/084; B25J 13/081; B25J 13/08; B25J 15/0009; B25J 15/0019; B25J 9/1682; B25J 9/1674; G05D 1/0038; G05D 1/0061; G05D 1/0088; G05D 2201/02; B60W 10/00; B60W 50/16; B60W 60/005; B60W 60/0061; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00
USPC .......................... 700/83, 245, 248, 250, 264
See application file for complete search history.

(56) References Cited

U.S. PATENT DOCUMENTS

| 7,881,957 | B1 * | 2/2011 | Cohen | G06Q 10/06 |
| 8,458,687 | B1 * | 6/2013 | Kang | G06F 9/5027 |
| | | | | 717/168 |
| 8,830,057 | B1 * | 9/2014 | Poursohi | G01N 33/00 |
| | | | | 340/540 |
| 9,026,483 | B1 * | 5/2015 | Cohen | G06Q 10/06375 |
| | | | | 706/46 |
| 10,398,056 | B1 * | 8/2019 | Bryan | B25J 9/1682 |
| 10,499,190 | B1 * | 12/2019 | Douglas, Jr. | H04W 4/20 |
| 2010/0241693 | A1 * | 9/2010 | Ando | G06Q 30/06 |
| | | | | 709/203 |
| 2012/0095908 | A1 * | 4/2012 | Barrie | G06Q 30/02 |
| | | | | 705/39 |
| 2018/0025299 | A1 * | 1/2018 | Kumar | H04L 67/306 |
| | | | | 709/224 |
| 2018/0104829 | A1 * | 4/2018 | Altman | B25J 19/005 |
| 2018/0147721 | A1 * | 5/2018 | Griffin | A47L 11/4011 |
| 2018/0211654 | A1 * | 7/2018 | Jacobson | G10L 15/07 |
| 2018/0247081 | A1 * | 8/2018 | Helsel | G06F 21/30 |
| 2018/0284760 | A1 * | 10/2018 | Gupta | B25J 13/006 |
| 2018/0304465 | A1 * | 10/2018 | Hodge | G05D 1/0282 |

(Continued)

*Primary Examiner* — B M M Hannan
(74) *Attorney, Agent, or Firm* — Van Pelt, Yi & James LLP

(57) ABSTRACT

An indication of a task to be performed in a network data center is received. A robotic manipulator of an autonomous robot is controlled to autonomously perform at least a portion of the task. It is determined that an assistance is required in performing an identified limited portion of the task. A notification of a request for the assistance is provided. A remote assistance from an operator in performing the identified limited portion of the task is received. Autonomous performance of the task is resumed after completion of the remote assistance for the identified limited portion of the task.

20 Claims, 5 Drawing Sheets

(56) References Cited

U.S. PATENT DOCUMENTS

| | | | | |
|---|---|---|---|---|
| 2018/0349247 | A1* | 12/2018 | Hanes | H04L 69/40 |
| 2019/0291277 | A1* | 9/2019 | Oleynik | B25J 9/163 |
| 2019/0387203 | A1* | 12/2019 | Sue | G05D 1/0088 |
| 2020/0272949 | A1* | 8/2020 | Chen | H04W 4/025 |

* cited by examiner

AUTONOMOUS ROBOT TELEROBOTIC INTERFACE

BACKGROUND OF THE INVENTION

Network data centers are facilities used to store computer systems and components, such as data storage systems and their associated components. Modern network data centers are typically large facilities that require sophisticated power distribution, cooling, cabling, fire suppression, and physical security systems. The operation of network data centers requires substantial direct involvement of human workers. However, human resources are oftentimes limited in network data centers, and efficiency suffers when human resources are insufficient to promptly perform all of the abovementioned tasks.

BRIEF DESCRIPTION OF THE DRAWINGS

Various embodiments of the invention are disclosed in the following detailed description and the accompanying drawings.

DETAILED DESCRIPTION

Figure 1:
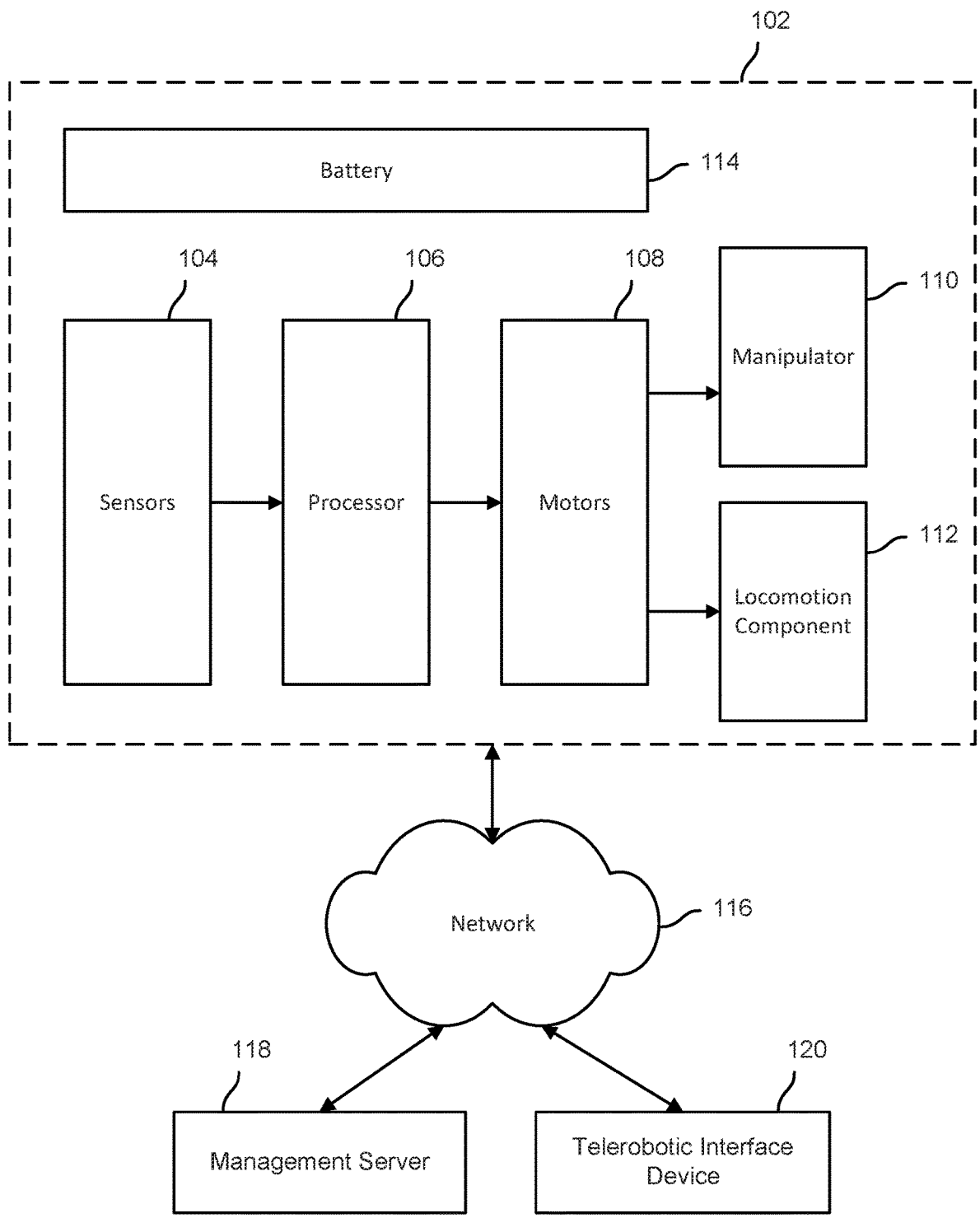
FIG. 1 is a block diagram illustrating an embodiment of a system for assisting an autonomous robot.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The operation of network data centers typically requires substantial direct involvement of human workers. For example, some network data center components require periodic power cycling in the course of normal operation, and while power cycling of this nature can usually be performed via electronic signals, oftentimes a human worker needs to manually perform power cycling when electronic signals are ineffective. In addition, human involvement is often required in order to connect cables in network data centers as well as to maintain cooling and fire suppression systems. Human workers are also needed to physically patrol and monitor the premises to ensure the security of network data centers.

A further source of inefficiency is that network data center environments are designed to accommodate human workers. For example, network data centers must operate at temperatures cool enough to be comfortable for human workers, and network data center components must be placed in locations that human workers are able to reach. As network data centers become larger, to reduce cooling expenses and conserve space, it would be beneficial to operate network data centers at higher temperatures and build network data centers so that network data center components are packed more densely and stacked higher than human workers are able to reach. Therefore, there exists a need to address the problems outlined above. In other words, there exists a need for a way to more efficiently utilize human resources in network data centers and at the same time conserve other resources, such as energy and space In some embodiments, the autonomous robot may be requested to use a robotic manipulator attached to the autonomous robot to autonomously power cycle a network data center component, install and/or remove a network data center component, transport a network data center component, and perform any other task useful in the operation of a network data center. The autonomous robot may have one or more types of sensors, including light detection and ranging (LIDAR) components, one or more video cameras, radio-frequency identification (RFID) components, an odometer, and/or any other type of sensor. The autonomous robot may receive an indication of a task to perform via a network that connects the autonomous robot to other devices. When the autonomous robot receives the indication of a task to be performed with the robotic manipulator, a series of steps required to perform the task is determined. If the autonomous robot attempts to perform a step in the series of steps and it is determined that the autonomous robot needs assistance, a notification of a request for an assistance is provided. In some embodiments, the notification of a request for the assistance is sent via a network that connects the autonomous robot to other devices, and the autonomous robot receives a remote assistance from an operator via the network. The remote assistance is provided by controlling the robotic manipulator through a telerobotic interface device. In some embodiments, the telerobotic interface device may use a virtual reality display device to display the environment perceived by the autonomous robot. The environment displayed by the virtual reality display device may be photorealistic or a rendering that is less than photorealistic. An augmented reality display device may be used to display computer renderings that overlay photorealistic image data. In some embodiments, a computer monitor display device may be used to display photorealistic image data or a rendering that is less than photorealistic. Thus, the robotic manipulator is controlled to perform the step(s) that the autonomous robot could not successfully perform on its own autonomously.

In some embodiments, the telerobotic interface device includes components that can be worn, including around a hand (i.e., a glove is worn), a wrist, an elbow joint, an arm, and any other part of a body. In some embodiments, position sensors may be used to link movements of the wearable components to movements of a robotic manipulator. For example, if the robotic manipulator includes an end effector shaped in a way that resembles a human hand, the movements of the end effector may track the movements of a wearable component covering the hand (i.e., track a glove's movements). If the robotic manipulator is shaped in a way that resembles a human arm, the movements of the robotic manipulator may track the movements of components worn around a wrist, elbow joint, and/or arm. If there is more than one robotic manipulator, there may be more than one set of wearable components such that each robotic manipulator has a set of wearable components to control that robotic manipulator. There may be more than one set of wearable components such that a robotic manipulator tracks the movements of one of the sets and the other set is used to give other types of movement and/or non-movement instructions. Wearable components may be physically built into a structure. For example, the wearable components may be one or more sleeves built into a desk where one or more arms can fit into the sleeves to control one or more robotic manipulators. In some embodiments, one or more robotic manipulators are controlled by one or more joysticks. In some embodiments, the telerobotic interface device may include a touchscreen interface that displays the environment perceived by an autonomous robot and accepts inputs for controlling the autonomous robot. In various embodiments, an autonomous robot will resume autonomous performance of a task after completion of a remote assistance.

FIG. 1 is a block diagram illustrating an embodiment of a system for assisting an autonomous robot. Autonomous robot 102 includes sensors 104, processor 106, motors 108, manipulator 110, locomotion component 112 and battery 114. In the example shown, sensors 104 receive inputs from the external environment of autonomous robot 102. Sensors 104 may include one or more sensors that assist autonomous robot 102 in navigating within and interacting with a network data center environment. For example, sensors 104 may include LIDAR components, including one or more photodetectors that detect reflected light produced by one or more lasers, other optical instruments, including one or more video cameras, RFID components, an odometer, and/or any other type of sensor. In some embodiments, an RFID component may passively receive radio-frequency signals from stationary transmitters located in the network data center that transmit and impart location information to nearby autonomous robots. In some embodiments, an RFID component actively transmits an identification signal and receives location information transmitted from nearby stationary transmitters in response to the identification signal. In the example shown, data received by sensors 104 are passed to processor 106 for processing. In some embodiments, processor 106 is configured to implement a simultaneous localization and mapping (SLAM) algorithm that solves the computational problem of using the data received by sensors 104 to update a map of the network data center environment contained in processor 106 while simultaneously keeping track of the location of autonomous robot 102. In some embodiments, processor 106 is configured to contain a preloaded map of the network data center, and the preloaded map is updated by a SLAM algorithm. The map may also specify locations of network devices within the network data center. In the example shown, processor 106 manages motors 108, and motors 108 move manipulator 110 and activate locomotion component 112. An example of manipulator 110 is a robotic manipulator that is a robotic arm that includes links and joints and an end effector. In some embodiments, the end effector is shaped in a way that resembles a human hand, e.g. with independent fingers and an opposable thumb. In some embodiments, the end effector is a robotic pincher claw. In some embodiments, the manipulator, including the end effector, includes tactile sensors to model the human sense of touch and proprioception. Examples of tactile sensors include force sensors, kinesthetic sensors, thermal sensors, and any other component for sensing a physical environment. In some embodiments, locomotion component 112 translocates autonomous robot 102 within the network data center. Examples of locomotion components include one or more wheels, one or more tracks shaped in a way that resembles tank tracks, one or more assemblies of links and joints resembling a human leg, and any other type of component for producing locomotion. In the example shown, battery 114 provides energy to the components in autonomous robot 102.

In the example shown in FIG. 1, portions of the communication path between the components are shown. Other communication paths may exist, and the example of FIG. 1 has been simplified to illustrate the example clearly. In the example shown, network 116 connects autonomous robot 102, management server 118, and telerobotic interface device 120. Examples of network 116 include one or more of the following: a direct or indirect physical communication connection, mobile communication network, Internet, intranet, Local Area Network, Wide Area Network, Storage Area Network, and any other form of connecting two or more systems, components, or storage devices together. In the example shown, management server 118 communicates with and manages autonomous robot 102 via network 116. Examples of management server 118 include any hardware or software system, component, process, and/or application. In the example shown, telerobotic interface device 120 communicates and interfaces with autonomous robot 102 via network 116. Telerobotic interface device 120 may include one or more hardware or software systems, components, processes, and/or applications. In some embodiments, telerobotic interface device 120 includes a virtual reality and/or augmented reality display component to display video camera data received by sensors 104 and processed by processor 106. Telerobotic interface device 120 may use a computer monitor display to display video camera data. In various embodiments, telerobotic interface device 120 can remotely control manipulator 110 and/or locomotion component 120. For example, telerobotic interface device 120 instructs processor 106 to operate motors 108 to control manipulator 110 and/or locomotion component 112. In some embodiments, telerobotic interface device 120 includes wearable components equipped with position sensors, and the wearable components translate an operator's finger, hand, wrist, elbow, and/or arm movements to corresponding movements of manipulator 110. In some embodiments, the wearable components transmit force feedback corresponding to physical attributes measured by tactile sensors attached to manipulator 110. In some embodiments, telerobotic interface device 120 includes one or more joysticks that control manipulator 110 and/or locomotion component 112. Telerobotic interface device 120 may include a touchscreen interface that displays video camera data received by sensors 104 and processed by processor 106 and can also be used to control manipulator 110 and/or locomotion component 112. Although single instances of components have been shown to simplify the diagram, additional instances of any of the components shown in FIG. 1 may exist. The number of components and the connections shown in FIG. 1 are merely illustrative. For example, additional instances of autonomous robot 102 may exist. These additional autonomous robots may be managed by management server 118 and/or a different management server in a system different from a system containing management server 118. Furthermore, these additional autonomous robots may interface with telerobotic interface device 120 and/or a different telerobotic interface device in a system different from a system containing telerobotic interface device 120. Management server 118 and/or telerobotic interface device 120 may be physically separate systems that are not necessarily located in the same geographic location as the network data center where autonomous robot 102 is located. Components not shown in FIG. 1 may also exist.

Figure 2:
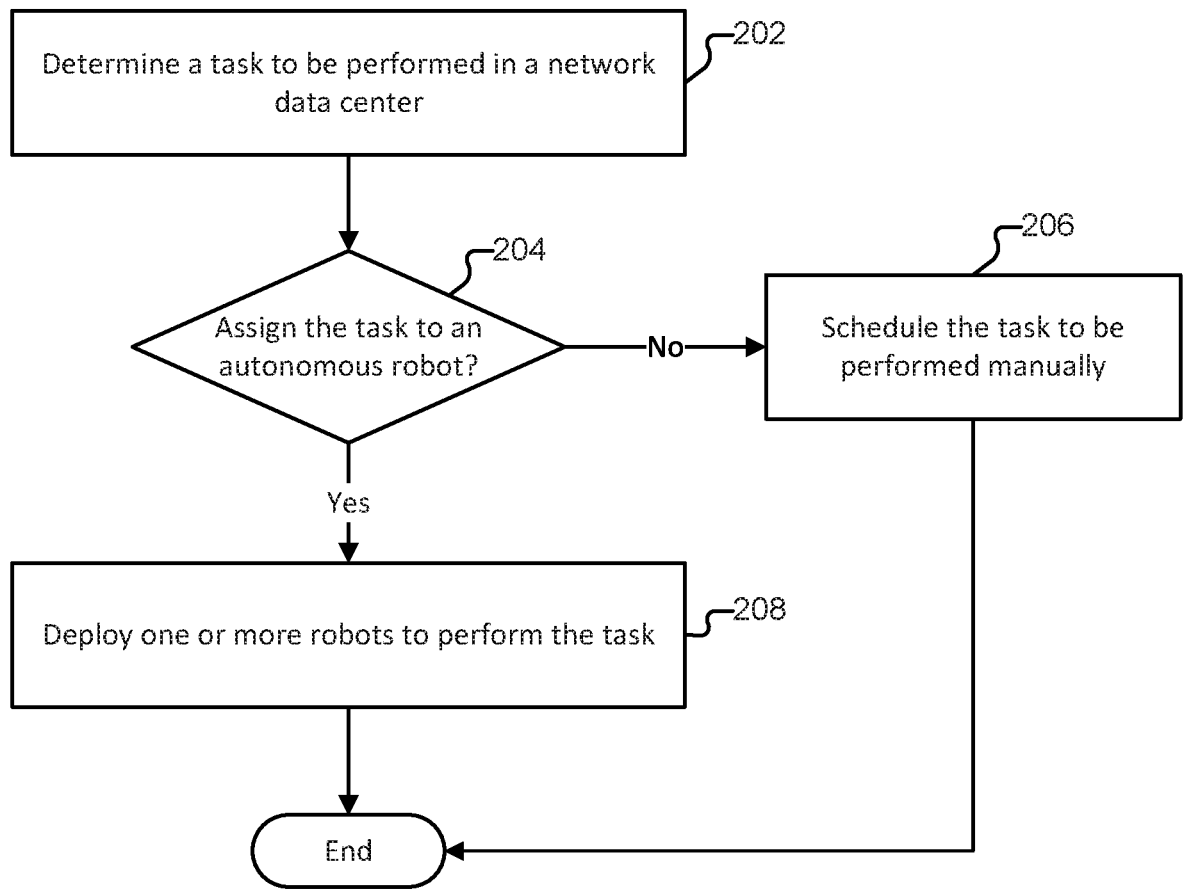
FIG. 2 is a flow chart illustrating an embodiment of a process for scheduling a task to be performed in a network data center.

FIG. 2 is a flow chart illustrating an embodiment of a process for scheduling a task to be performed in a network data center. In some embodiments, the process of FIG. 2 is implemented in management server 118 of FIG. 1.

At 202, a task to be performed in a network data center is determined. In some embodiments, a management server such as management server 118 of FIG. 1 automatically determines the task to be performed. For example, the task may be a part of an automatically scheduled maintenance, an upgrade plan, and/or in response to a detected event (e.g., detected error). One or more configured rules and/or workflows may automatically trigger the task based on an automatic detection of a triggering event (e.g., error) and/or dependent step (e.g., completion of a previous task) A management server selecting the task may be any hardware or software system, component, process, and/or application. The task may be selected among a range of preconfigured tasks to be performed in network data centers, including power cycling a network data center component, installing and/or removing a network data center component, transporting a network data center component, and performing any other type of task. In some embodiments, the task to be performed is the next task in a list of tasks supplied to a management server by a user. In some embodiments, determining a task to be performed includes determining the priorities of a group of tasks and selecting the highest priority task.

At 204, it is determined whether to assign the task to an autonomous robot. If at 204 it is determined that the task should not be assigned to an autonomous robot to perform, at 206, the task is scheduled to be performed manually. If at 204 it is determined that the task should be assigned to an autonomous robot to perform, at 208, one or more autonomous robots are deployed to perform the task. In some embodiments, determining whether to assign the task to an autonomous robot includes determining whether an autonomous robot is capable of performing the task and/or assessing the probability that an autonomous robot would succeed in performing the task. In some embodiments, autonomous robot 102 of FIG. 1 is deployed to perform the task. In some embodiments, a management server provides the location in the network data center where the task is to be performed along with any other type of information necessary to perform the task.

Figure 3:
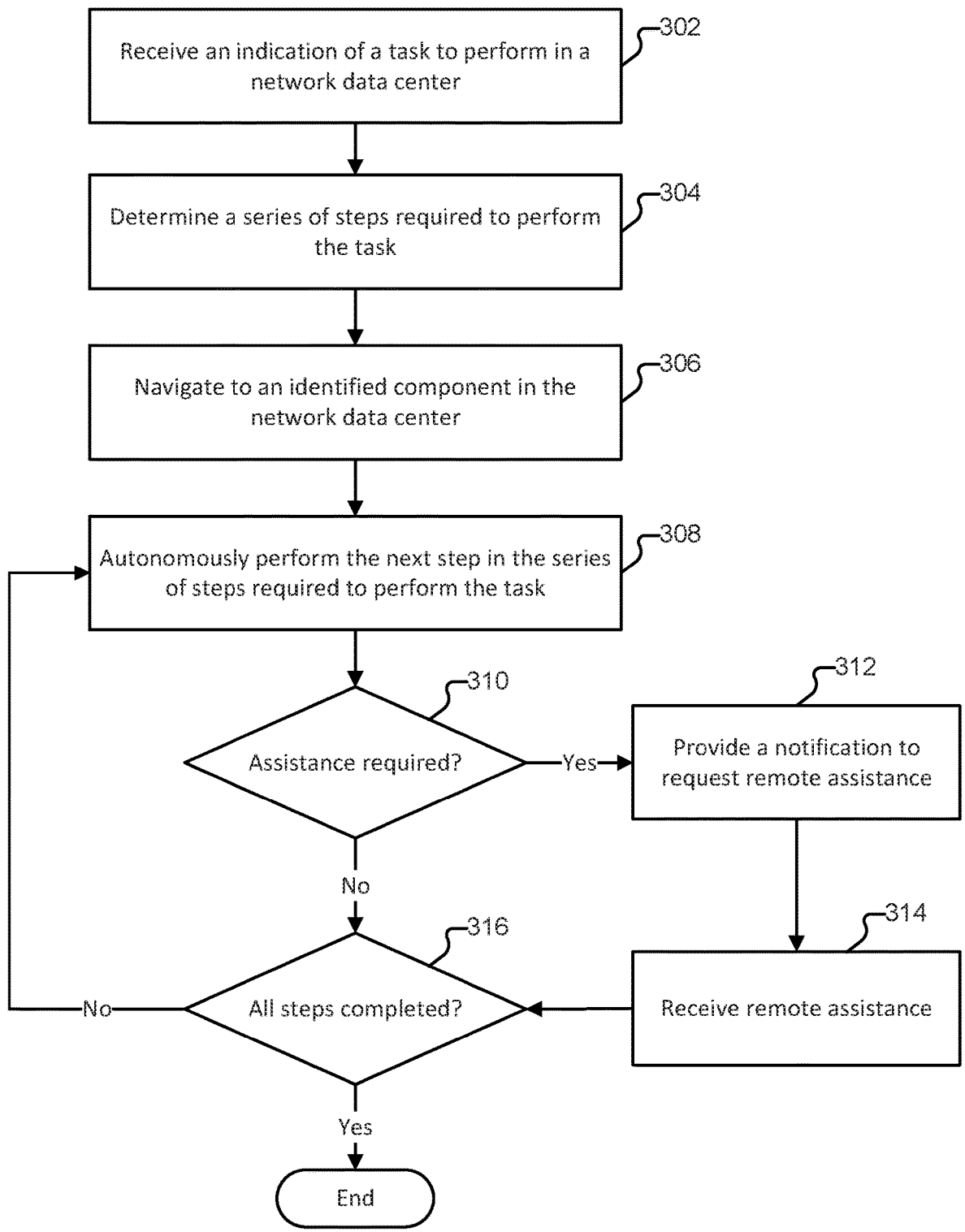
FIG. 3 is a flow chart illustrating an embodiment of a process for autonomously performing a task.

FIG. 3 is a flow chart illustrating an embodiment of a process for autonomously performing a task. Remote assistance may be requested and received when necessary. In some embodiments, the process of FIG. 3 is implemented in autonomous robot 102 of FIG. 1.

At 302, an indication of a task to be performed in a network data center is received by an autonomous robot. For example, the task to be performed is the task determined to be assigned to the autonomous robot in 204 of FIG. 2. In some embodiments, the indication of a task to be performed is transmitted by management server 118 of FIG. 1. In some embodiments, this transmission of a task to be performed is received via network 116 of FIG. 1.

At 304, a series of steps required to perform the task is determined. In some embodiments, the series of steps are identified among a group of steps that have been preconfigured. In some embodiments, at least a portion of the series of steps are automatically generated/adapted based at least in part one or more provided parameters of the task to be performed. For example, the series of steps have been automatically generated based on a specific type and/or location of a target network device to be serviced. Determining the series of steps may include determining a workflow of the series of steps that includes branches and conditionals that dynamically affect which step is performed in the series of steps.

If the task is to power cycle a component in a network data center, steps required to perform the power cycling may include identifying the component to be power cycled, unplugging the component from its power source, plugging the component into its power source, and any other steps needed for power cycling the component. In some embodiments, the component is identified by processor 106 of FIG. 1 processing data generated by sensors 104 of FIG. 1. Manipulator 110 of FIG. 1 may be used to unplug and plug in the component. In some embodiments, if a slot holds the component in place, the manipulator is to unplug the component from its power source by pulling the component outward from the slot a sufficient distance to disengage the component from its power source and then plug the component into its power source by pushing the component inward toward the slot a similar distance. Power cycling may consist of toggling a switch or button, in which case manipulator 110 of FIG. 1 may perform the corresponding flipping, pushing, and any other movements needed to perform the power cycling.

If the task is to transport a component, steps required to transport the component may include picking up the component in one location in the network data center, putting down the component at another location, and any other steps needed to transport the component. In various embodiments, manipulator 110 of FIG. 1 may be used to grab, pick up, hold, drop, place, and perform any other type of manipulation needed to transport the component. The component may be transported to dispose of the component, bring the component to a location for installation, take the component to a location after uninstalling the component, and/or for any other purpose in a network data center. If the task is to install a component, steps required to install the component may include any steps required to transport the component to the installation location, identifying a space, such as a slot, where the component is to be installed, positioning the component into the space where the component is to be installed, and any other steps needed to install the component. In some embodiments, the space where the component is to be installed may be identified by processor 106 of FIG. 1 processing data generated by sensors 104 of FIG. 1. In various embodiments, manipulator 110 of FIG. 1 may be used to position the component into the space where the component is to be installed. If the task is to remove a component, steps required to remove the component may include identifying the component to remove, pulling the component out of a space, such as a slot, that it is installed in, and any other steps needed to remove a component. In some embodiments, the component to be removed may be identified by processor 106 of FIG. 1 processing data generated by sensors 104 of FIG. 1. In various embodiments, manipulator 110 of FIG. 1 may be used to pull the component out of the space where it is installed. The tasks described above and the steps required to perform those tasks are merely illustrative. Tasks and steps not described may also exist.

At 306, navigation to an identified component in a network data center is performed. In some embodiments, processor 106 of FIG. 1 determines how to navigate autonomous robot 102 of FIG. 1 from one location in the network data center to another location in the network data center. For example, processor 106 of FIG. 1 may be configured to implement a simultaneous localization and mapping (SLAM) algorithm that incorporates location data collected by sensors 104 of FIG. 1 to determine the location of autonomous robot 102 of FIG. 1 in the network data center in real time as processor 106 of FIG. 1 directs motors 108 of FIG. 1 to activate locomotion component 112 of FIG. 1 to translocate autonomous robot 102 of FIG. 1.

At 308, a next step in the series of steps required to perform the task is performed autonomously. For example, a workflow of the determined series of steps is executed/performed by the autonomous robot by executing component steps in an order/flow of the workflow. One or more of the steps may be a conditional step triggered based on a detected sensor input of the autonomous robot and/or state of a target network component. Examples of a step that may be performed include unplugging a component, plugging in a component, identifying a component and/or space, picking up a component, putting down a component, positioning a component into a space, pulling a component out of a space, and any other step in a series of step required to perform a task. The task may be any type of task performed in network data centers, including power cycling a network data center component, installing and/or removing a network data center component, transporting a network data center component, and performing any other type of task.

At 310, it is determined whether assistance is required. For example, if the autonomous robot encounters a situation that it is unable to handle, the autonomous robot is to request remote assistance from a human operator. The assistance may be requested whenever an unexpected and/or unknown state is detected, an expected state is not detected, and/or a specified assistance required state is detected. The triggering state may be based on received sensor inputs of the robot and/or a received state about a network device or state. For example, the determination to request assistance may be made based on one or more detected sensor inputs (e.g., camera image) and/or received information about a network device (e.g., network device state information received via a network connection). In one example, a detected camera image is processed to detect an expected interaction point a network device (e.g., handle, button, etc.) but the expected interaction point of the network device cannot be detected (e.g., machine learning model confidence score on a location of the interaction point in the image is below threshold). In another example, a network device is to be in an expected state (e.g., powered off state, reset state, etc.) after manipulation by the autonomous robot but the network device is not in the expected state. These detected conditions may trigger a predefined rule and/or control/work flow to request the assistance. The assistance may be for a portion of the series of steps and once the portion requiring assistance is indicated and/or detected as successfully completed, autonomous performance of the rest of the series of steps is resumed.

In some embodiments, whether assistance is required may be determined after an attempt is made to perform a step in the series of steps required to perform a task. For example, if the step to be performed is identifying a component, autonomous robot 102 of FIG. 1 may first attempt to identify the component but then determine that identification is not possible. Identification may not be possible because the component is mislabeled, it is obscured by another object in the network data center, and/or any other reason identification is not possible. If the step to be performed is a manipulation of a component, including pulling, pushing, lifting, putting down, and/or any other manipulation needed to perform the step, autonomous robot 102 of FIG. 1 may first attempt to perform the manipulation but then determine that the manipulation is not possible. Autonomous robot 102 may not be able to autonomously perform the manipulation because the manipulation requires an unfamiliar combination of pulling, pushing, lifting, and/or any other type of movement, the manipulation requires an unfamiliar type of movement, the manipulation requires movements too precise and/or specific for the autonomous robot to perform without training, and/or any other reason the manipulation cannot be performed autonomously.

If at 310 it is determined that assistance is not required, at 316 it is determined whether all steps in the series of steps required to perform the task have been completed. With the current step having been performed and completed, all steps will have been completed if the current completed step is the last step. If it is not the last step, then it is determined that the next step in the series of steps required to perform the task should be autonomously performed at 308.

If at 310 it is determined that assistance is required, at 312 a notification to request remote assistance is provided. Sending the notification may include sending a notification to a server (e.g., management server) or other device that manual remote assistance from a human user/administrator is required. In some embodiments, the notification is a push notification that is sent to a mobile device, telerobotic interface device 120 of FIG. 1, management server 118 of FIG. 1, and/or any other recipient that is able to act on or pass along the notification. In various embodiments, the notification is sent via network 116 of FIG. 1.

At 314, remote assistance is received. In some embodiments, the assistance is received by autonomous robot 102. The type of assistance received depends on the step for which assistance is requested. For example, if assistance is requested to identify a component to manipulate, processor 106 of FIG. 1 may directly receive data tagging a component to manipulate. If assistance is requested to manipulate a component, manipulator 110 of FIG. 1 may be controlled remotely to complete the manipulation or the part of the manipulation requiring remote assistance. Other types of remote assistance are also possible, and the particular type of remote assistance received will depend on the step for which remote assistance is required. After the remote assistance is received, at 316, it is determined whether all steps in the series of steps required to perform the task have been completed. With the current step having been performed and completed, all steps will have been completed if the current completed step is the last step. If it is not the last step, then it is determined that the next step in the series of steps required to perform the task should be autonomously performed at 308.

Figure 4:
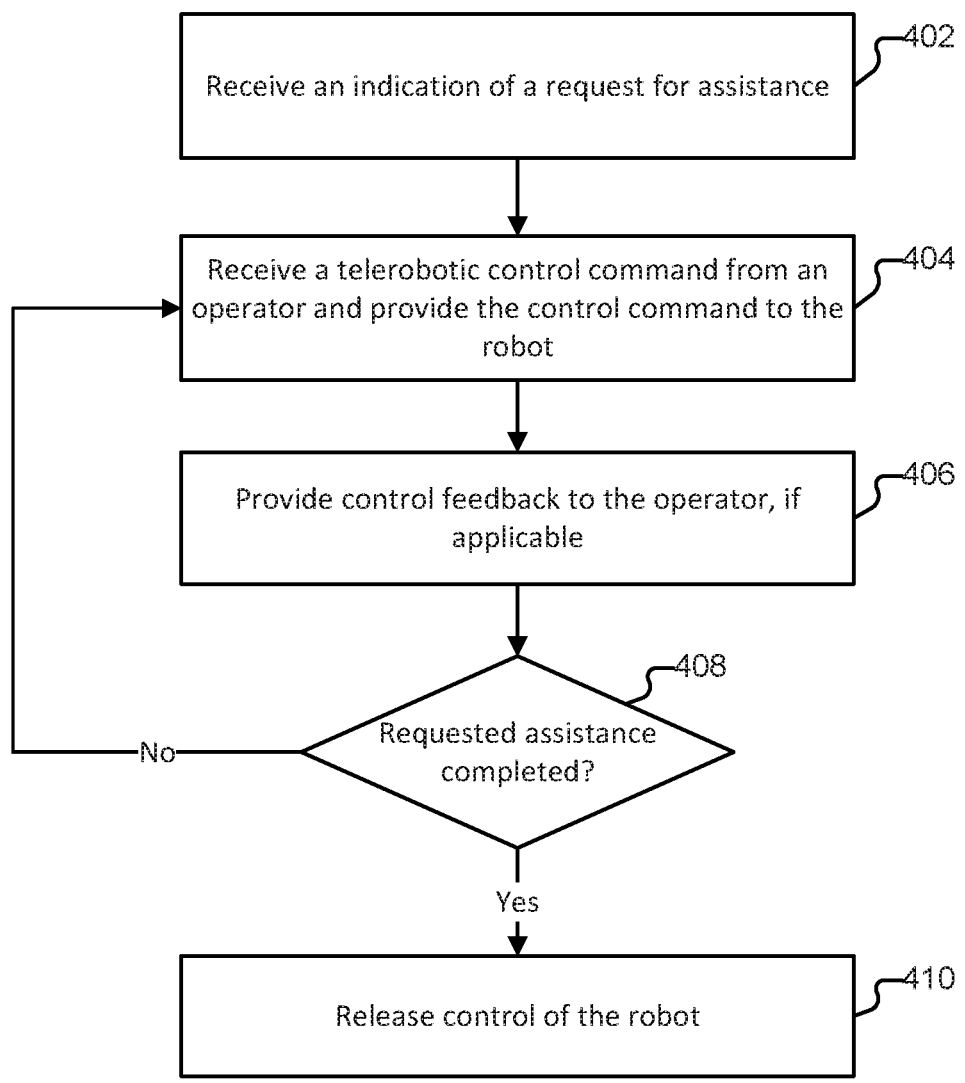
FIG. 4 is a flow chart illustrating an embodiment of a process for providing remote assistance.

FIG. 4 is a flow chart illustrating an embodiment of a process for providing remote assistance. In some embodiments, the process of FIG. 4 is implemented in telerobotic interface device 120 of FIG. 1. In some embodiments, at least a portion of remote assistance provided using the process of FIG. 4 is received in 314 of FIG. 3.

At 402, an indication of a request for assistance is received. In some embodiments, the request for assistance is received by telerobotic interface device 120 of FIG. 1 via network 116 of FIG. 1. In various embodiments, telerobotic interface device 120 of FIG. 1 waits to receive a telerobotic control command from an operator.

At 404, a telerobotic control command from an operator is received and this telerobotic control command is provided to an autonomous robot. In some embodiments, the telerobotic control command may be sent via network 116 of FIG. 1 to autonomous robot 102 of FIG. 1. Examples of telerobotic control commands include operating sensors 104 of FIG. 1, e.g. specifying a direction to point a video camera, zooming in and out with the video camera, and any other video camera operation; operating manipulator 110 of FIG. 1, e.g. moving the manipulator left, right, up, down, forward, and/or backward a specified distance, rotating the manipulator a specified extent, grabbing, pulling, pushing, and/or lifting a component, and any other movement and/or manipulation; and any other type of control command.

At 406, if applicable, control feedback is provided to the operator. In some embodiments, manipulator 110 of FIG. 1 may be equipped with tactile sensors to model the human sense of touch and proprioception. Examples of tactile sensors include force sensors, kinesthetic sensors, thermal sensors, and any other component for sensing a physical environment. Examples of control feedback that may be provided include force feedback, vibrations, thermal feedback, and any other type of feedback. Force feedback may be used to simulate the sensation of weight and resistance to motion. Vibrations may be used to indicate physical contact between a robotic manipulator and a network data center component. In various embodiments, the telerobotic interface device may use a virtual reality and/or augmented reality display device and/or a computer monitor display device to display the environment perceived by the autonomous robot. In some embodiments, visual control feedback may be displayed. For example, a movement of manipulator 110 of FIG. 1 may be displayed as a corresponding movement, rendered in a photorealistic manner or less than photorealistic manner, in a virtual reality display device, augmented reality display device, computer monitor display device, and/or any other display device.

At 408, if it determined that the requested assistance is completed, at 410, control of the autonomous robot is released. In some embodiments, telerobotic interface device 120 of FIG. 1 sends a signal via network 116 of FIG. 1 to release control of autonomous robot 102 and return autonomous robot 102 to autonomous operation. The requested assistance is completed when no further telerobotic control commands are required to respond to a request for assistance. If another telerobotic control command is required to respond to the request for assistance, the requested assistance is not completed. If it is determined that the requested assistance is not completed, at 404, a further telerobotic control command is received and then provided to the autonomous robot.

Figure 5:
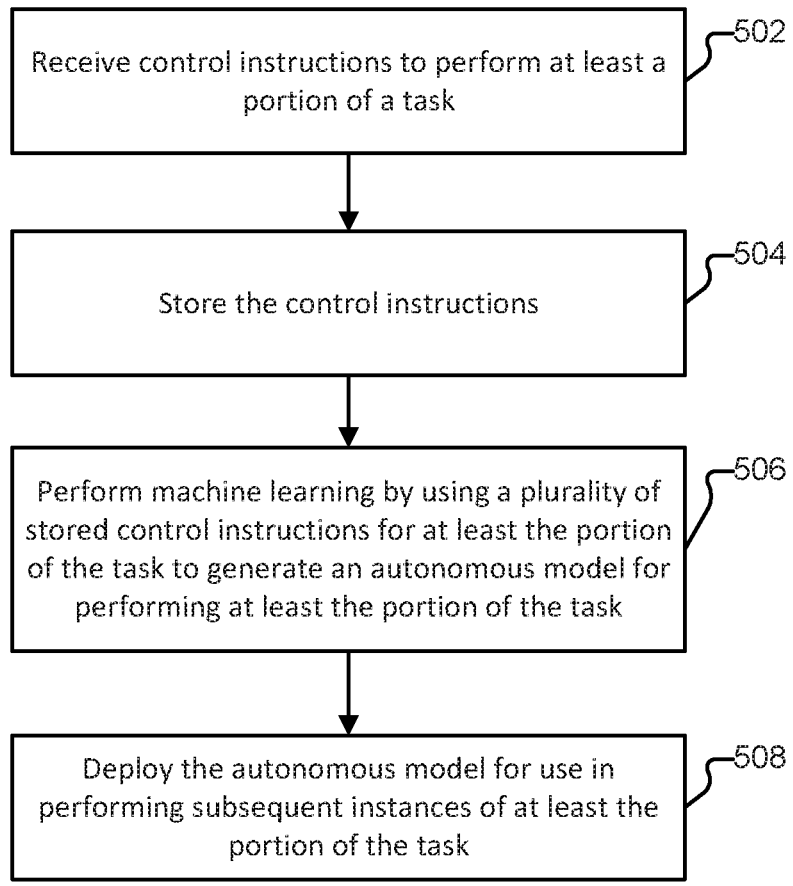
FIG. 5 is a flow chart illustrating an embodiment of a process for utilizing machine learning for performing a task.

FIG. 5 is a flow chart illustrating an embodiment of a process for utilizing machine learning for performing a task. In some embodiments, the process of FIG. 5 is implemented in autonomous robot 102 and/or management server 118 of FIG. 1. In order for an autonomous robot to autonomously perform one or more tasks of a network data center (e.g., perform a task in 308 of FIG. 3), the autonomous robot may need to be programmed and/or trained to perform the task. One way to enable the autonomous robot to learn to perform a new task is to train it using machine learning to build an autonomous model (e.g., workflow, series of recorded instructions, machine learning model, CNN model, etc.) for performing the new task. For example, users can remotely control the autonomous robot using a telerobotic interface device to perform the new task and the control commands are utilized as training data to generate the machine learning model for performing the new task. In some embodiments, the autonomous model for performing a task is improved/retrained based on new training data (e.g., new control commands received in 404 of FIG. 4).

At 502, control instructions to perform at least a portion of a task are received. In some embodiments, the control instructions are received from telerobotic interface device 120 of FIG. 1. Examples of control instructions include instructions for operating sensors 104 of FIG. 1, instructions for operating manipulator 110 of FIG. 1, and any other types of control instructions. For example, the control instructions may be a series of movements of manipulator 110 of FIG. 1. The control instructions may have been provided because autonomous robot 102 is unable to autonomously perform at least a portion of the task (e.g., new task that the robot is currently learning to perform) and/or has encountered an unknown situation or an error (e.g., control instructions include one or more control commands received in 404 of FIG. 4.

At 504, the control instructions are stored. In some embodiments, the control instructions are stored in processor 106 of FIG. 1. In some embodiments, the control instructions are stored in one or more systems physically separate from autonomous robot 102 of FIG. 1. In some embodiments, the control instructions may undergo processing in one or more systems physically separate from autonomous robot 102 of FIG. 1 and then sent via network 116 of FIG. 1 to be stored in autonomous robot 102 of FIG. 1.

At 506, machine learning is performed by using a plurality of stored control instructions for at least the portion of the task to generate an autonomous model for performing at least the portion of the task. For example, one or more machining learning models are generated, built and/or updated. In some embodiments, if identifying a network device component is at least a portion of the task, machine vision learning may be implemented. For example, a convolutional neural network (CNN) with an input layer, one or more hidden convolutional, pooling, and/or fully connected layers, and an output layer may be trained to build a model to classify and identify components. In some embodiments, rule-based machine learning may be trained to perform specific robotic manipulator movements when specific network device components are identified. In some embodiments, each set of stored control instructions may be used to train a long short-term memory (LSTM) recurrent neural network (RNN) in which the output is a specific sequence of movements. In contrast to a CNN, which may be used to identify and classify images, an RNN, such as an LSTM RNN may be used to predict sequential patterns, such as a sequence of fine movements. In some embodiments, each set of stored control instructions may be used to train an RNN where the predicted sequential pattern is a sequence of general steps required to perform a task. An example of such a sequence may be to move the end effector of manipulator 110 of FIG. 1 to an identified component, then grab the component, then lift up on the component, and then pull the component. The number of steps and type of steps predicted by the RNN would vary depending on the task presented to the autonomous robot as well as other inputs, such as data received by sensors.

In some embodiment, a specific sequence of stored control instructions causing a specific sequence of movements of a robotic manipulator is stored as a series of steps (e.g., in a workflow). These series of steps may be loaded and repeated when the task is to be performed in a same/similar context. For example, if an autonomous robot could not successfully perform a manipulation and a set of control instructions received during remote assistance resulted in a successful manipulation, the autonomous robot may load and reproduce those control instructions when encountering a subsequent similar manipulation.

At 508, the autonomous model for performing subsequent instances of at least the portion of the task is deployed. In various embodiments, the autonomous model is based on training in the form of past control instructions that were used to successfully assist an autonomous robot. In some embodiments, an updated autonomous model is deployed after each instance of training, i.e., the autonomous model is continuously updated. In some embodiments, the autonomous model that is deployed is updated after a specified amount of additional training, i.e. the autonomous model is not continuously updated. Examples of autonomous models are those based on CNNs, RNNs, rule-based learning, and any other types of machine learning models.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for assisting an autonomous robot, comprising:
    a robotic manipulator; and
    a processor configured to:
        receive an indication of a task to perform in a network data center;
        control the robotic manipulator to autonomously perform at least a portion of the task;
        determine that an assistance is required in performing an identified limited portion of the task;
        provide a notification of a request for the assistance, wherein the requested assistance is for the identified limited portion of the task among a series of steps required to perform the task and a limited type scope of the requested assistance is associated with a resumption of autonomous performance of a remaining portion of the series of steps of the task after the identified limited portion of the task to complete the task;
        receive a remote assistance from an operator in performing the identified limited portion of the task; and
        resume autonomous performance of the task after completion of the remote assistance for the identified limited portion of the task.

2. The system of claim 1, wherein the task includes power cycling a network device of the network data center.

3. The system of claim 1, wherein the task includes grabbing a network data center component with the robotic manipulator.

4. The system of claim 1, wherein the robotic manipulator is equipped with one or more tactile sensors.

5. The system of claim 1, wherein the indication of the task is received from a management server.

6. The system of claim 1, wherein the notification of the request for the assistance includes a push notification.

7. The system of claim 1, further comprising at least one video camera sensor.

8. The system of claim 1, further comprising one or more LIDAR sensors.

9. The system of claim 1, wherein the processor is further configured to navigate the autonomous robot around stationary and moving obstacles.

10. The system of claim 1, wherein the processor is further configured to track a location of the autonomous robot within the network data center.

11. The system of claim 10, wherein simultaneous localization and mapping (SLAM) is utilized to keep track of the autonomous robot's location within the network data center.

12. The system of claim 11, wherein the processor is further configured to include a preloaded map of locations of network devices of the network data center.

13. The system of claim 1, wherein the processor is further configured to send sensory data to a virtual reality or augmented reality display device.

14. The system of claim 1, wherein the processor is further configured to receive remote assistance that tracks movements of wearable components.

15. The system of claim 1, wherein the processor is further configured to utilize machine learning to autonomously perform the at least the portion of the task.

16. The system of claim 15, wherein each remote assistance received from an operator is used to train the autonomous robot in performing subsequent instances of the at least the portion of the task.

17. The system of claim 16, wherein training the autonomous robot includes training an artificial neural network.

18. The system of claim 1, wherein a machine learning model is used to determine when the assistance is required in performing the identified limited portion of the task.

19. A method of assisting an autonomous robot, comprising:
    receiving an indication of a task to perform in a network data center;
    controlling a robotic manipulator to autonomously perform at least a portion of the task;
    determining that an assistance is required in performing an identified limited portion of the task;
    providing a notification of a request for the assistance, wherein the requested assistance is for the identified limited portion of the task among a series of steps required to perform the task and a limited type scope of the requested assistance is associated with a resumption of autonomous performance of a remaining portion of the series of steps of the task after the identified limited portion of the task to complete the task;
    receiving a remote assistance from an operator in performing the identified limited portion of the task; and
    resuming autonomous performance of the task after completion of the remote assistance for the identified limited portion of the task.

20. A non-transitory computer readable storage medium storing thereon a computer program product, wherein the computer program product comprising computer instructions for:
- receiving an indication of a task to perform in a network data center;
- controlling a robotic manipulator to autonomously perform at least a portion of the task;
- determining that an assistance is required in performing an identified limited portion of the task;
- providing a notification of a request for the assistance, wherein the requested assistance is for the identified limited portion of the task among a series of steps required to perform the task and a limited type scope of the requested assistance is associated with a resumption of autonomous performance of a remaining portion of the series of steps of the task after the identified limited portion of the task to complete the task;
- receiving a remote assistance from an operator in performing the identified limited portion of the task; and
- resuming autonomous performance of the task after completion of the remote assistance for the identified limited portion of the task.

* * * * *